(12) United States Patent
Thiebaut et al.

(10) Patent No.: US 12,457,252 B2
(45) Date of Patent: Oct. 28, 2025

(54) COORDINATION BETWEEN WIRELINE AND WIRELESS POLICY CONTROLLERS

(71) Applicant: NOKIA SOLUTIONS AND NETWORKS OY, Espoo (FI)

(72) Inventors: Laurent Thiebaut, Antony (FR); Christele Bouchat, Antwerp (BE); Yang Shen, Beijing (CN)

(73) Assignee: NOKIA SOLUTIONS AND NETWORKS OY, Espoo (FI)

(*) Notice: Subject to any disclaimer, the term of this patent is extended or adjusted under 35 U.S.C. 154(b) by 689 days.

(21) Appl. No.: 17/620,554

(22) PCT Filed: Jun. 18, 2019

(86) PCT No.: PCT/CN2019/091793
§ 371 (c)(1),
(2) Date: Dec. 17, 2021

(87) PCT Pub. No.: WO2020/252672
PCT Pub. Date: Dec. 24, 2020

(65) Prior Publication Data
US 2022/0255971 A1  Aug. 11, 2022

(51) Int. Cl.
H04W 4/00 (2018.01)
H04L 65/1069 (2022.01)
(Continued)

(52) U.S. Cl.
CPC ........ H04L 65/1069 (2013.01); H04W 92/04 (2013.01); H04W 84/22 (2013.01);
(Continued)

(58) Field of Classification Search
None
See application file for complete search history.

(56) References Cited

U.S. PATENT DOCUMENTS

2004/0158646 A1* 8/2004 Miernik ............. H04L 47/2408
709/207
2009/0305684 A1* 12/2009 Jones .................... H04L 63/20
455/418
(Continued)

FOREIGN PATENT DOCUMENTS

CN         103312613 A     9/2013
WO    WO 2018/233484 A1   12/2018
(Continued)

OTHER PUBLICATIONS

Office Action for Chinese Application No. 201980099478.5 dated May 26, 2023, 20 pages.
(Continued)

Primary Examiner — Bob A Phunkulh
(74) Attorney, Agent, or Firm — ALSTON & BIRD LLP

(57) ABSTRACT

Embodiments of the disclosure provide a method, device and computer readable medium for coordination between wireline and wireless policy controllers. According to embodiments of the present disclosure, the service controller is able to coordinate between information about a wireless subscription for mapping from a traffic multiplexer used in a wireline access to a wireless data session selector and information sent to a wireline Residential Gateway device about mapping application traffic to a traffic multiplexer used in a wireline access.

12 Claims, 10 Drawing Sheets

(51) Int. Cl.
*H04W 92/04* (2009.01)
*H04W 84/22* (2009.01)
*H04W 88/14* (2009.01)
*H04W 88/16* (2009.01)
*H04W 92/14* (2009.01)
*H04W 92/24* (2009.01)

(52) U.S. Cl.
CPC ............ *H04W 88/14* (2013.01); *H04W 88/16* (2013.01); *H04W 92/14* (2013.01); *H04W 92/24* (2013.01)

(56) References Cited

U.S. PATENT DOCUMENTS

| | | | | |
|---|---|---|---|---|
| 2010/0106845 | A1* | 4/2010 | Hu | H04W 76/12 709/228 |
| 2012/0036541 | A1* | 2/2012 | Kotecha | H04L 41/50 725/62 |
| 2012/0177028 | A1* | 7/2012 | Mo | H04M 15/66 370/351 |
| 2013/0084826 | A1* | 4/2013 | Mo | H04L 12/1407 455/406 |
| 2014/0056130 | A1* | 2/2014 | Grayson | H04W 76/12 370/230 |
| 2019/0021064 | A1* | 1/2019 | Ryu | H04W 60/06 |
| 2019/0268973 | A1* | 8/2019 | Bull | H04W 92/02 |
| 2019/0357129 | A1* | 11/2019 | Park | H04W 60/04 |
| 2019/0364541 | A1* | 11/2019 | Ryu | H04W 80/10 |
| 2019/0373441 | A1* | 12/2019 | Ryu | H04W 48/18 |
| 2020/0053803 | A1* | 2/2020 | Youn | H04W 76/10 |
| 2020/0092790 | A1* | 3/2020 | Salkintzis | H04W 76/10 |
| 2020/0120570 | A1* | 4/2020 | Youn | H04W 36/324 |
| 2020/0259681 | A1 | 8/2020 | Li et al. | |
| 2020/0280843 | A1* | 9/2020 | Foti | H04W 88/16 |
| 2020/0280873 | A1 | 9/2020 | Yan et al. | |
| 2021/0037380 | A1* | 2/2021 | Lee | H04W 8/06 |
| 2021/0168584 | A1* | 6/2021 | Li | H04W 48/18 |
| 2024/0264816 | A1* | 8/2024 | Lea | H04L 67/34 |
| 2024/0267336 | A1* | 8/2024 | Yang | H04L 47/2483 |

FOREIGN PATENT DOCUMENTS

| | | |
|---|---|---|
| WO | WO 2019/080754 A1 | 5/2019 |
| WO | WO 2019/084822 A1 | 5/2019 |

OTHER PUBLICATIONS

Office Action for Chinese Application No. 201980099478.5 dated Feb. 28, 2024, 10 pages.
Office Action for Chinese Application No. 201980099478.5 dated May 17, 2024, 12 pages.
"3rd Generation Partnership Project; Technical Specification Group Core Network and Terminals; User Equipment (UE) policies for 5G System (5GS); Stage 3 (Release 15)", 3GPP TS 24.526 v15.2.0, (Mar. 2019), 40 pages.
"3rd Generation Partnership Project; Technical Specification Group Services and System Aspects, Wireless and wireline convergence access support for the 5G System (5GS) (Release 16)", 3GPP TS 23.316 v0.3.0, (May 2019), 63 pages.
"3rd Generation Partnership Project; Technical Specification Group Services and System Aspects; Policy and Charging Control Framework for the 5G System; Stage 2 (Release 16)", 3GPP TS 23.503 v16.1.0, (Jun. 2019), 99 pages.
"3rd Generation Partnership Project; Technical Specification Group Services and System Aspects; Procedures for the 5G System; Stage 2 (Release 15)", 3GPP TS 23.502 v15.1.0, (Mar. 2018), 285 pages.
"3rd Generation Partnership Project; Technical Specification Group Services and System Aspects; System Architecture for the 5G System; Stage 2 (Release 16)", 3GPP TS 23.501 v16.1.0, (Jun. 2019), 368 pages.
Broadband Forum Technical Report, TR-069 Amendment 3, CPE WAN Management Protocol, Issue 1 (Nov. 2010), 197 pages.
Broadband Forum Technical Report, TR-181, Device Data Model, Issue: 2 Amendment 12, (Mar. 2018), 174 pages.
Broadband Forum Technical Report, TR-369, User Services Platform (USP) Issue 1 Corrigendum 2, (Nov. 2018), 203 pages.
Huawei et al., "UE URSP Policy vs TR-069 TR-396 Management for 5G-RG", 3GPP TSG-SA WG2 Meeting #132, S2-1903722, (Apr. 8-12, 2019), 4 pages.
International Preliminary Report on Patentability for Patent Cooperation Treaty Application No. PCT/CN2019/091793 dated Dec. 21, 2021, 5 pages.
International Search Report and Written Opinion for Patent Cooperation Treaty Application No. PCT/CN2019/091793 dated Mar. 19, 2020, 7 pages.
Telstra, "5WWC: QoS Framework Proposal", SA WG2 Meeting #129, S2-1810967, (Oct. 15-19, 2018), 9 pages.
Extended European Search Report for European Application No. 19933282.6 dated Jan. 2, 2023, 13 pages.
Tencent, "N3/N9 Tunnels for the MA-PDU Session", SA WG2 Meeting #133, CR 1330, S2-1905159, (May 13-17, 2019), 7 pages.
Office Action for European Application No. 19933282.6 dated Mar. 6, 2025, 8 pages.

* cited by examiner

COORDINATION BETWEEN WIRELINE AND WIRELESS POLICY CONTROLLERS

CROSS-REFERENCE TO RELATED APPLICATIONS

This application is a national phase entry of International Application No. PCT/CN2019/091793, filed Jun. 18, 2019, the entire contents of which are incorporated herein by reference.

FIELD

Embodiments of the present disclosure generally relate to communication techniques, and more particularly, to methods, devices and computer readable medium for coordination between wireline and wireless policy controllers.

BACKGROUND

In recent years, communication technologies have been significantly developed. For example, the $5^{th}$ generation (5G) communication allows more traffic on channels and achieves higher speed. 5G systems aim at supporting a wider range of devices than just smartphones and mobile entities. They target also support of and connectivity with wireline devices via residential gateways (RGs) Different residential gateways (RGs) will need to be served: 5G-RG i.e. RG updated to support access to the 5G core network (5GC) but also FN-RG i.e. RG not updated to support access to the 5G core network (5GC).

SUMMARY

Generally, embodiments of the present disclosure relate to a method for coordination between wireline and wireless policy controllers and the corresponding communication devices.

In a first aspect, embodiments of the disclosure provide a first device. The first device comprises: at least one processor, and a memory coupled to the at least one processor, the memory storing instructions therein, the instructions, when executed by the at least one processor, causing the first device to: obtain, at the first device and from a second device in a core network, first information about a wireless subscription for mapping from a traffic multiplexer used in a wireline access to a wireless data session selector. The first device is also caused to receive, from a third device, traffic within a traffic multiplexer used in a wireline access, the traffic multiplexer being mapped in the third device from an application based on second information. The first device is further caused to map the traffic multiplexer used in the wireline access to a wireless data session selector based on the first information. The first device is yet caused to transmit, to the core network, a request for a wireless data session based on the wireless data session selector.

In a second aspect, embodiments of the disclosure provide a second device. The second network device comprises: at least one processor, and a memory coupled to the at least one processor, the memory storing instructions therein, the instructions, when executed by the at least one processor, causing the second device to: receive, from a fourth device, first information about a wireless subscription for mapping from a traffic multiplexer used in a wireline access to a wireless data session selector. The second device is also caused to transmit the first information to a first device.

In a third aspect, embodiments of the disclosure provide a third device. The third network device comprises: at least one processor, and a memory coupled to the at least one processor, the memory storing instructions therein, the instructions, when executed by the at least one processor, causing the third device to receive second information from a fourth device, the second information being for mapping an application to a traffic multiplexer used in a wireline access. The third device is also caused to in response to detecting application traffic, map the application traffic to the traffic multiplexer based on the second information. The third device is further caused to transmit, based on the second information, a wireline data session request on the mapped traffic multiplexer used in a wireline access. The third device is yet caused to transmit the first information to a second device.

In a fourth aspect, embodiments of the disclosure provide a fourth device. The fourth network device comprises: at least one processor, and a memory coupled to the at least one processor, the memory storing instructions therein, the instructions, when executed by the at least one processor, causing the fourth device to determine first information about a wireless subscription for mapping from a traffic multiplexer used in a wireline access to a wireless data session selector, the first information being provided to a second device. The fourth device is further caused to determine second information for mapping an application to a traffic multiplexer used in a wireline access, to ensure mapping between the first information and the second information.

In a fifth aspect, embodiments of the present disclosure provide a method. The method comprises: obtaining, at a first device and from a second device in a core network, first information about a wireless subscription for mapping from a traffic multiplexer used in a wireline access to a wireless data session selector. The method also comprises receiving, from a third device, traffic within a traffic multiplexer used in a wireline access, the traffic multiplexer being mapped in the third device from an application based on second information. The method further comprises mapping the traffic multiplexer used in the wireline access to a wireless data session selector based on the first information. The method yet comprises transmitting, to the core network, a request for a wireless data session based on the wireless data session selector.

In a sixth aspect, embodiments of the present disclosure provide a method. The method comprises receiving, from a fourth device, first information about a wireless subscription for mapping from a traffic multiplexer used in a wireline access to a wireless data session selector. The method also comprises transmitting the first information to a first device.

In a seventh aspect embodiments of the present disclosure provide a method. The method comprises receiving second information from a fourth device, the second information being for mapping an application to a traffic multiplexer used in a wireline access. The method also comprises in response to detecting application traffic, mapping the application traffic to a traffic multiplexer used in a wireline access based on the second information. The method further comprises transmitting, based on the second information, a wireline data session request on the mapped traffic multiplexer used in a wireline access. The method yet comprises transmitting the first information to a second device.

In an eighth aspect embodiments of the present disclosure provide a method. The method comprises determining second information for mapping an application to a traffic multiplexer used in a wireline access. The method further comprises transmitting the second information to a third device. The method also comprises determining, based on the second information, first information about a wireless subscription for mapping from a traffic multiplexer used in a wireline access to a wireless data session selector, to ensure mapping between the first information and the second information. The method yet comprises transmitting the first information to a second device.

In a ninth aspect, embodiments of the disclosure provide an apparatus. The apparatus comprises means for obtaining, at the first device and from a second device in a core network, first information about a wireless subscription for mapping from a traffic multiplexer used in a wireline access to a wireless data session selector. The apparatus further comprises means for receiving, from a third device, traffic within a traffic multiplexer used in a wireline access, the traffic multiplexer being mapped in the third device from an application based on second information. The apparatus also comprises means for mapping the traffic multiplexer used in the wireline access to a wireless data session selector based on the first information. The apparatus yet comprises means for transmitting, to the core network, a request for a wireless data session based on the wireless data session selector.

In a tenth aspect, embodiments of the disclosure provide an apparatus. The apparatus comprises means for receiving, from a fourth device, first information about a wireless subscription for mapping from a traffic multiplexer used in a wireline access to a wireless data session selector. The apparatus further comprises means for transmitting the first information to a first device.

In an eleventh aspect, embodiments of the disclosure provide an apparatus. The apparatus comprises means for means for receiving second information from a fourth device, the second information being for mapping an application to a traffic multiplexer used in a wireline access. The apparatus also comprises means for in response to detecting application traffic, mapping the application traffic to a traffic multiplexer used in a wireline access based on the second information. The apparatus further comprises means for transmitting, based on the second information, a wireline data session request on the mapped traffic multiplexer used in a wireline access.

In a twelfth aspect, embodiments of the disclosure provide an apparatus. The apparatus comprises means for determining second information for mapping an application to a traffic multiplexer used in a wireline access. The apparatus further comprises means for transmitting the second information to a third device. The apparatus also comprises means for determining, based on the second information, first information about a wireless subscription for mapping from a traffic multiplexer used in a wireline access to a wireless data session selector, to ensure mapping between the first information and the second information. The apparatus yet comprises means for transmitting the first information to a second device.

In a thirteenth aspect, embodiments of the disclosure provide a computer readable medium. The computer readable medium stores instructions thereon, the instructions, when executed by at least one processing unit of a machine, causing the machine to implement the method according to any one of the fifth aspect, the sixth aspect, the seventh aspect or the eighth aspect.

Other features and advantages of the embodiments of the present disclosure will also be apparent from the following description of specific embodiments when read in conjunction with the accompanying drawings, which illustrate, by way of example, the principles of embodiments of the disclosure.

BRIEF DESCRIPTION OF THE DRAWINGS

Embodiments of the disclosure are presented in the sense of examples and their advantages are explained in greater detail below, with reference to the accompanying drawings, where.

Throughout the figures, same or similar reference numbers indicate same or similar elements.

DETAILED DESCRIPTION OF EMBODIMENTS

Figure 1:
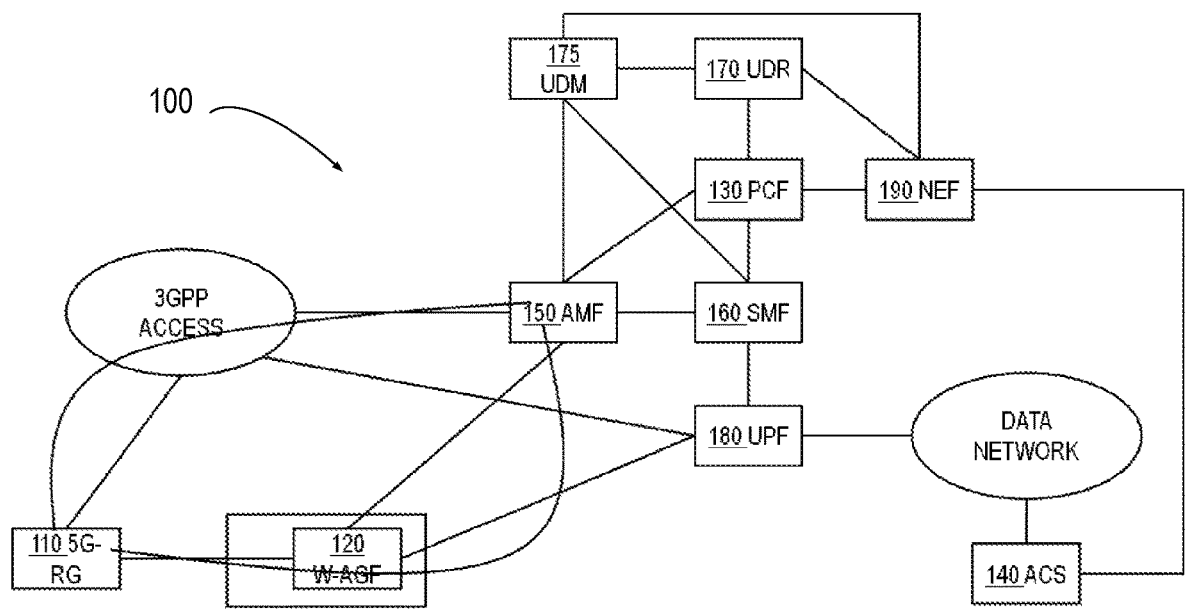
FIG. 1 illustrates a schematic diagram of a 5G-RG communication environment according to conventional technologies.

The subject matter described herein will now be discussed with reference to several example embodiments. It should be understood these embodiments are discussed only for the purpose of enabling those skilled persons in the art to better understand and thus implement the subject matter described herein, rather than suggesting any limitations on the scope of the subject matter.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two functions or acts shown in succession may in fact be executed concurrently or may sometimes be executed in the reverse order, depending upon the functionality/acts involved.

As used herein, the term "communication network" refers to a network following any suitable communication standards, such as New Radio (NR), Long Term Evolution (LTE), LTE-Advanced (LTE-A), Wideband Code Division Multiple Access (WCDMA), High-Speed Packet Access (HSPA), and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) communication protocols, and/or any other protocols either currently known or to be developed in the future.

Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system. For the purpose of illustrations, embodiments of the present disclosure will be described with reference to 5G communication system.

The term "network device" used herein includes, but not limited to, a base station (BS), a gateway, a registration management entity, and other suitable device in a communication system. The term "base station" or "BS" represents a node B (NodeB or NB), an evolved NodeB (eNodeB or eNB), a NR NB (also referred to as a gNB), a Remote Radio Unit (RRU), a radio header (RH), a remote radio head (RRH), a relay, a low power node such as a femto, a pico, and so forth.

The term "terminal device" used herein includes, but not limited to, "user equipment (UE)" and other suitable end device capable of communicating with the network device. By way of example, the "terminal device" may refer to a terminal, a Mobile Terminal (MT), a Subscriber Station (SS), a Portable Subscriber Station, a Mobile Station (MS), or an Access Terminal (AT).

The term "circuitry" used herein may refer to one or more or all of the following:
(a) hardware-only circuit implementations (such as implementations in only analog and/or digital circuitry) and
(b) combinations of hardware circuits and software, such as (as applicable):
(i) a combination of analog and/or digital hardware circuit(s) with
software/firmware and
(ii) any portions of hardware processor(s) with software (including digital signal processor(s)), software, and memory(ies) that work together to cause an apparatus, such as a mobile phone or server, to perform various functions) and
(c) hardware circuit(s) and or processor(s), such as a microprocessor(s) or a portion of a microprocessor(s), that requires software (e.g., firmware) for operation, but the software may not be present when it is not needed for operation."

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As discussed above, the 5G communication and the wireline communication use different residential gateways which should be coordinated. In 5G communication network, the 5G-RG is used which has been modified for accessing to 5G core network. The 5G-RG may act as a $3^{rd}$ generation partnership project (3GPP) user equipment (UE), which is assumed to terminate 3GPP non-access stratum (NAS) signalling and to support UE Route Selection Policy (URSP). In fixed network (FN), the FN-RG is used which is un-modified for accessing to the 5G core network. A wireline access entity (for example, access gateway function (AGF) device) may terminate the 3GPP NAS signalling on behalf of the FN-RG.

FIG. 1 illustrates a schematic diagram of a communication system 100 for 5G-RG using wireline 5G access network to access to the 5G core network. As shown in FIG. 1, the communication system 100 may comprise the 5G-RG 110, the W-AGF 120, a policy control function (PCF) 130. The communication system 100 may also comprise one or more of: a service controller (for example, an auto-configuration server (ACS) 140), an access and mobility management function (AMF) 150, a session management function (SMF) 160, a unified data repository (UDR) 170, a network exposure function (NEF) 190, a user data management (UDM) 175 and a user plane function (UPF) 180. It should be noted that the devices shown in FIG. 1 are only examples. The 5G-RG 110, the W-AGF 120 and the ACS 140 may relate to wireline access. The interfaces among devices are omitted for the clarity purpose.

As shown in FIG. 1, the 5G-RG 110 may behave as a regular 3GPP UE. That is to say, the 5G-RG 110 is able to exchange NAS/N1 signalling with the 5G core network. The NAS/N1 signalling may comprise: NAS Registration Management and Connection Management (RM/CM) to register to and establish a signalling connectivity with the 5G core network; NAS session management (SM) to establish/modify/release data connectivity capabilities via the 5G core network (called PDU Sessions). The 5G-RG 110 is able to receive URSP policies from the PCF 130 via the AMF 150.

Figure 2:
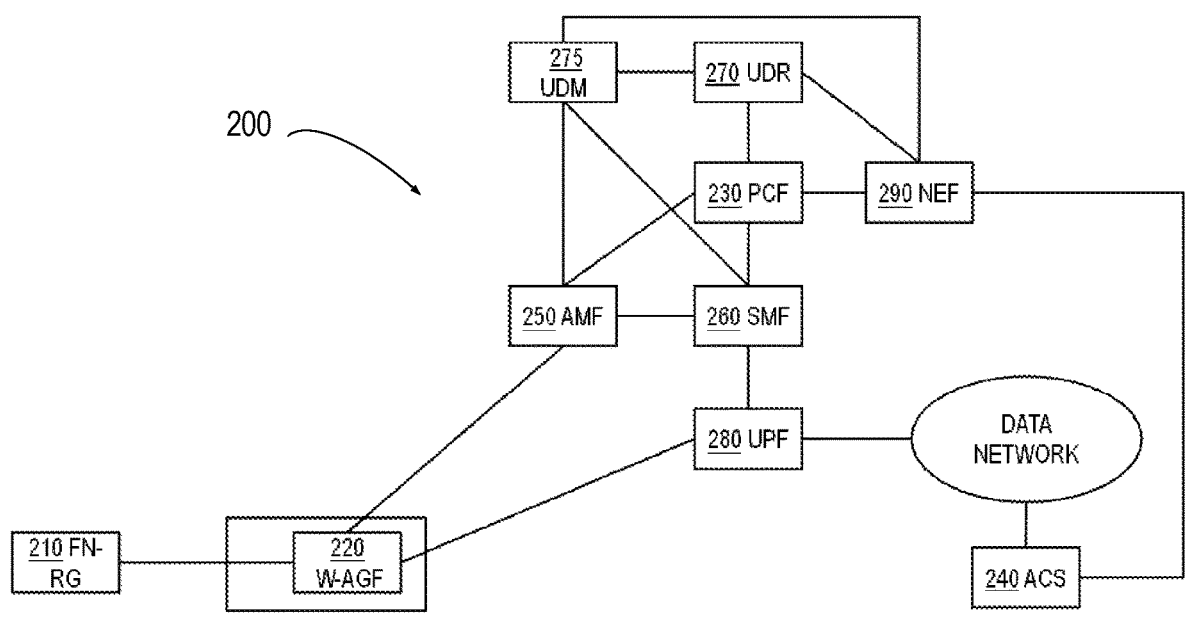
FIG. 2 illustrates a schematic diagram of a FN-RG communication environment according to conventional technologies.

FIG. 2 illustrates a schematic diagram of a communication system 200 for FN-RG. As shown in FIG. 2, the communication system 200 may comprise the FN-RG 210, the W-AGF 220, a policy control function (PCF) 230. The communication system 200 may also comprise an auto-configuration server (ACS) 240, an access and mobility management function (AMF) 250, a session management function (SMF) 260, a unified data repository (UDR) 270, a network exposure function (NEF) 290, a user data management (UDM) 275 and a user plane function (UPF) 280. It should be noted that the modules, entities and devices shown in FIG. 2 are only examples. The FN-RG 210, the W-AGF 220 and the ACS 240 may relate to wireline access. The interfaces among devices are omitted for the clarity purpose.

As shown in FIG. 2, the 3GPP N1/NAS for the FN-RG 210 is terminated on W-AGF 220. The W-AGF 220 may exchange NAS/N1 signalling with the 5G core network on behalf of the FN-RG 210 which the W-AGF 220 serves. The NAS/N1 signalling may comprise: NAS RM/CM to register to and establish a signalling connectivity with the 5G core network; NAS SM to establish/modify/release data connectivity capabilities via the 5G core network (called PDU Sessions). The W-AGF 220 may be able to receive the URSP policies from the PCF 240 via the AMF 250.

From the perspective of the 5G core network, both the 5G-RG 110 and the FN-RG 210 are terminal devices. Thus, the PCF 140/240 may determine and transmit corresponding URSP policies to the 5G-RG 110 or to the W-AGF 220 in case of FN-RG 210. The PCF 140/240 may obtain policy related subscription information about a terminal device (or a RG) from the UDR 170/270.

Moreover, in wireline network, the ACS 140/240 may configure RG deployed in the customer premises by Wireline operators. Both 5G-RG 110 and FN-RG 210 may receive policies from the wireline ACS 140/240. The 5G-RG 110 and FN-RG 210 may use the User plane to exchange information with the ACS 140/240.

However, the potential policies related coordination between ACS and PCF policies have not been discussed yet. The potential policies may correspond to mapping from applications (for example, internet/IMS Voice/IPTV) to data sessions. The data sessions may relate to parameters, such as Data Network Name (DNN), slice identifier S-NSSAI, in 5GC, while they relate to the service multiplexer (for example, Virtual Local Area Network) used on the wireline access.

The potential policies may also correspond to QoS related policy mapping. More dynamic information related to the mapping of uplink (a link from the terminal device to the core network) IP flows (or Ethernet flows) to the QoS that this UL data flow needs to receive.

More specifically, regarding mapping from applications to data sessions, in 5GC the PCF 130 may provide the terminal device with URSP rules that contain a mapping from traffic filters to PDU Session parameters. The traffic filters may correspond to an application identity (for example, operation system ID) or to IP descriptors traffic related filters (e.g. Destination IP "3 Tuple") and other traffic descriptors. Wireline defined policies sent by the ACS 140 may associate an application (e.g. internet/IMS Voice/IPTV) with a L2 header acting as service multiplexer (e.g. VLAN) on the wireline access. Thus, it is necessary to define how both kind of rules map in case of 5G-RG and FN-RG networks.

Further, regarding QoS related policy mapping, in 3GPP at PDU Session establishment, the SMF 160/260 may obtain QoS policies from PCF 130/230. These policies map traffic identified by some filters (for example, filter could be an application ID or a 5 Tuple in case of IP type PDU Sessions or filtering on Ethernet headers in case of Ethernet type PDU Sessions) to a set of 3GPP QoS parameters of which main parameter is the 5QI. Traffic within a PDU Session that is to receive the same QoS treatment may be grouped within a QoS flow. The 5G core network signalling may provide 5G access network and terminal devices (for example, 5G-RG 110 or W-AGF 220 representing a FN-RG 210) with a mapping between a QoS Flow and 3GPP QoS parameters including the 5QI. Thus, it is necessary to define how this 5G core network signalling related with 5GC QoS maps to wireline QoS policies.

According to embodiments of the present disclosure, the service controller is able to coordinate between information about a wireless subscription for mapping from a traffic multiplexer used in a wireline access to a wireless data session selector and information sent to a wireline Residential Gateway device about mapping application traffic to a traffic multiplexer used in a wireline access. In this way, the communications between the network device and the configuration server are achieved, thereby coordinating wireline and wireless policies controllers.

Figure 3:
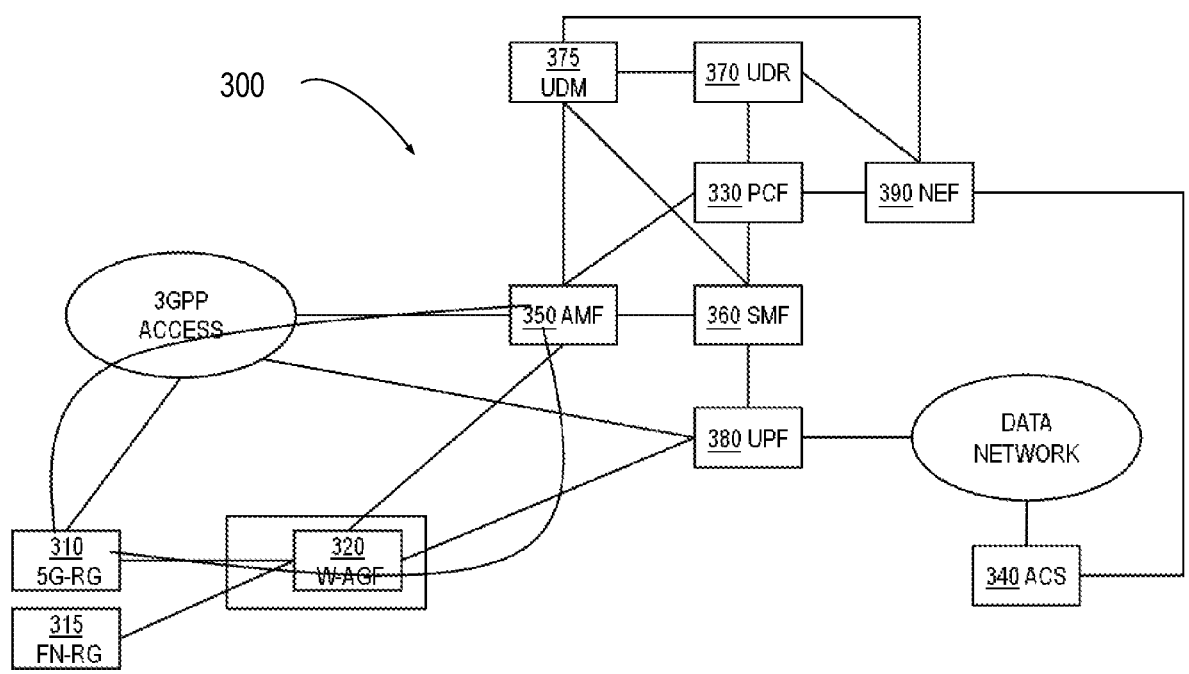
FIG. 3 illustrates a schematic diagram of a communication system according to embodiments of the present disclosure.

FIG. 3 illustrates a schematic diagram of a communication system 300 in which embodiments of the present disclosure can be implemented. As shown in FIG. 3, the communication system 300 may comprise a 5G-RG 310, a FN-RG 315, a W-AGF 320, a policy control function (PCF) 330. The communication system 300 may also comprise one or more of: an auto-configuration server (ACS) 340, an access and mobility management function (AMF) 350, a session management function (SMF) 360, a unified data repository (UDR) 370, a user data management (UDM) 375 a user plane function (UPF) 380 and a network exposure function (NEF) 390.

It should be noted that the 5G-RG 310, the FN-RG 315, the W-AGF 320, the PCF 330, the auto-configuration server (ACS) 340, the AMF 350, the SMF 360, the UDR 370, the UDM 375, the UPF 380 and the NEF 390 may be implemented at any devices, entities or modules. It should be noted that the devices, modules, or entities shown in FIG. 3 are only examples. It should be understood that the communication system 300 may also comprise other elements which are omitted for the purpose of clarity. It is to be understood that the numbers of devices, modules, or entities shown in FIG. 3 are given for the purpose of illustration without suggesting any limitations.

Communications in the communication system 300 may be implemented according to any proper communication protocol(s), including, but not limited to, cellular communication protocols of the first generation (1G), the second generation (2G), the third generation (3G), the fourth generation (4G) and the fifth generation (5G) and on the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, including but not limited to: Code Divided Multiple Address (CDMA), Frequency Divided Multiple Address (FDMA), Time Divided Multiple Address (TDMA), Frequency Divided Duplexer (FDD), Time Divided Duplexer (TDD), Multiple-Input Multiple-Output (MIMO), Orthogonal Frequency Divided Multiple Access (OFDMA) and/or any other technologies currently known or to be developed in the future.

Figure 4:
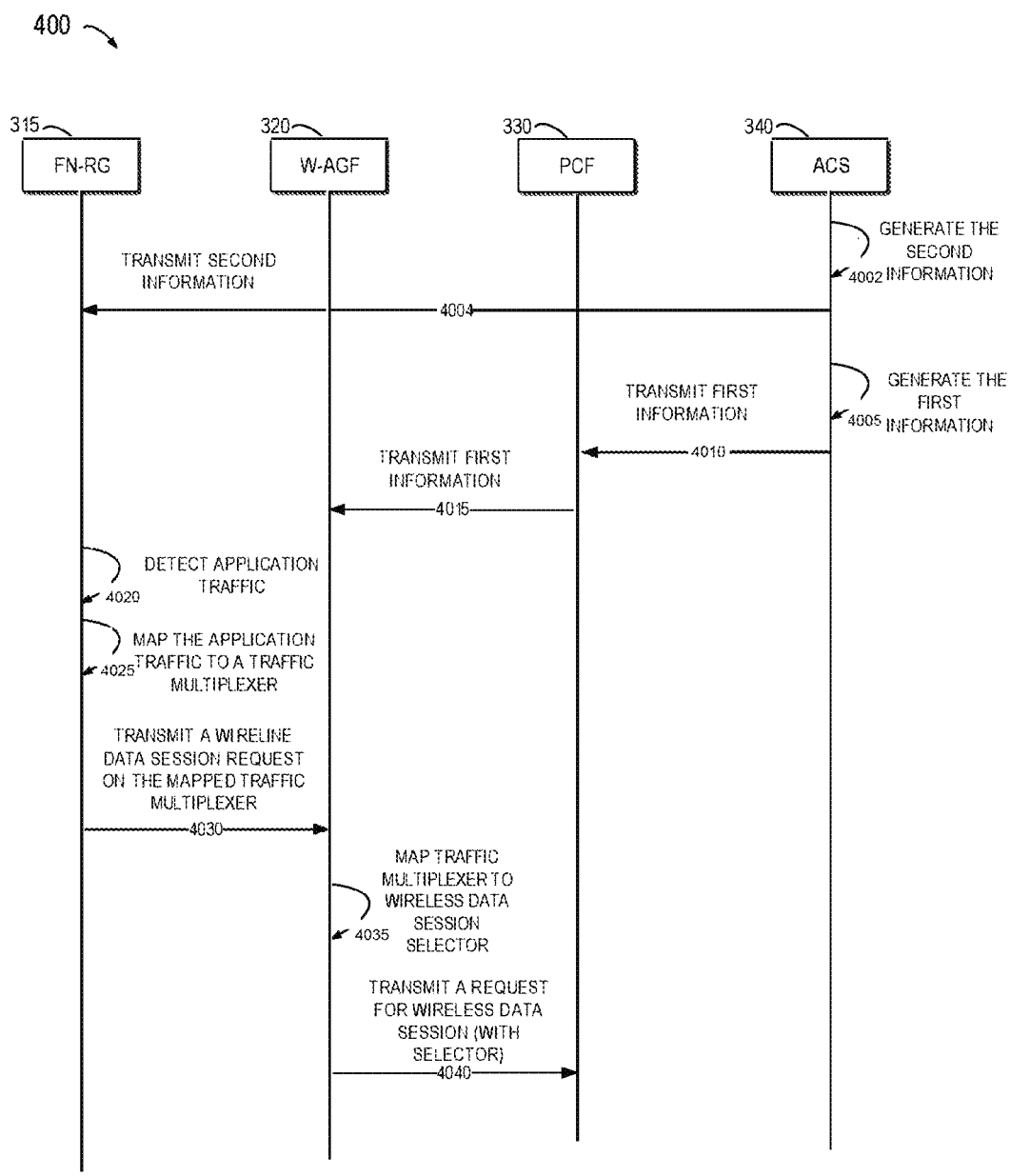
FIG. 4 illustrates a schematic diagram of interactions among devices according to embodiments of the present disclosure.

FIG. 4 illustrates a schematic diagram of interactions 400 in accordance with embodiments of the present disclosure. The interactions 400 may be implemented at any suitable devices. Only for the purpose of illustrations, the interactions 400 are described to be implemented among, the FN-RG 315, the W-AGF 320, the PCF 330 and the ACF 340.

For 5G-RG, the URSP sent by PCF 340 to 5G-RG 310 can control 5G-RG mapping from an application to PDU Session parameters (DNN, S-NSSAI). The wireline configuration defines also the mapping from application to the L2 header (VLAN) used as the service multiplexer on the wireline access.

For FN-RG, the ACS 340 may control how the FN-RG 315 to transmit UL traffic on VLAN corresponding to the target application. The ACS 340 generates 4002 the second information. The second information may be used for mapping the application to a traffic multiplexer used on the wireline access of the FN-RG 315. The ACS 340 transmits 4004 the second information to the FN-RG 315.

The ACS 340 generates 4005 the first information based on the second information in order to ensure the mapping between the first information and the second information. In this way, mapping between the first information and the second information is achieved. The first information is about the wireless subscription for mapping from a traffic multiplexer used in the wireline access to a wireless data session selector. Traffic multiplexer used in a wireline access exists and should not be changed due to 5GC introduction. In some embodiments, the ACS 340 may transmit 4010 information to the PCF 330. In some embodiments, the first information may not be directly transmitted from the ACS 340 to the PCF 330. In some embodiments, the OSS (operation) system co-ordinate the wireline parameter configuration for the wireline access in the ACS 340 through existing APIs on the ACS 340 with wireless subscription related policy data used by the PCF 330. The OSS system should make sure the coordination is done and could communicate with the PCF via the 3GPP NEF 390, UDM 375 and UDR 370. The wireless subscription is associated with the wireline access.

In some embodiments, the ACS 340 may transmit the first information to the UDM 375 (possibly via the NEF 390). The UDM 375 may store the first information in the UDR 370. The PCF 330 may access to the UDR 370 to obtain the first information. In this way, the indirection interactions between the ACS 340 and the PCF 330 have been accomplished. In this way, a new application program interface (API) among the UDM 375, the NEF 390 allow the ACS 340 or the OSS to control the mapping from multiplexing identifiers used on wireline access to data sessions handled by the 5G core network.

For example, in some embodiments, an operation support system (OSS) may ensure proper configuration of the wireless subscription with the list of subscribed PDU sessions of the corresponding user. For each subscribed PDU sessions, the service multiplexer (e.g. VLAN) used on the wireline access is also configured. In some embodiments, the OSS (or the ACS 340) may issue a request to ensure such configuration of the corresponding wireless subscription via the NEF 390. The NEF 390 may check the right to issue such request. The NEF 390 may forward the request to the UDM (375). The UDM 375 may update the SM (session management) subscription data in the UDR 370 of the corresponding user with the list of subscribed PDU sessions selectors (DNN, S-NSSAI). If the PCF 330 is aware that the terminal device (here W-AGF 320 acting on behalf of the end terminal FN-RG) is reachable, the PCF 330 may check whether the policy information such as URSP configuration on the W-AGF 320 is aligned. The 5G core network supports an API that can be used to configure the mapping between the service multiplexer (for example, VLAN) used on the V (wireline) interface of the W-AGF and PDU session subscription parameters (for example, DNN, Single Network Slice Selection Assistance Information (S-NSSAI)). Such API may be used by the ACS 340 or by the OSS.

The PCF 330 transmits 4015 the first information to the W-AGF 320. In some embodiments, the first information may be transmitted in the URSP policy. If the first information is transmitted in the URSP policy, it may reuse traffic filter information in URSP with the remark that URSP referring to Ethernet Headers have to be sent for a FN-RG 315 even though the USRP relates to a PDU Session of the IP type. Table 1 below shows the reuse traffic filter information in URSP. It should be noted that the headers shown in Table 1 are only examples.

TABLE 1

| | |
|---|---|
| 00000001 | Match-all type |
| 00001000 | OS Id + OS App Id type (NOTE) |
| 00010000 | IPv4 remote address type |
| 00100001 | IPv6 remote address/prefix length type |
| 00110000 | Protocol identifier/next header type |

TABLE 1-continued

| | |
|---|---|
| 01010000 | Single remote port type |
| 01010001 | Remote port range type |
| 01100000 | Security parameter index type |
| 01110000 | Type of service/traffic class type |
| 10000000 | Flow label type |
| 10000001 | Destination MAC address type |
| 10000011 | 802.1Q C-TAG VID type |
| 10000100 | 802.1Q S-TAG VID type |
| 10000101 | 802.1Q C-TAG PCP/DEI type |
| 10000110 | 802.1Q S-TAG PCP/DEI type |
| 10000111 | Ethertype type |

The FN-RG 315 detects 4020 the application traffic and maps 4025 the application to the traffic multiplexer used on the wireline access based on the second information. The application may comprise one or more of: IP Multimedia Subsystem (IMS) voice, Internet Protocol Television (IPTV), Internet. In some embodiments, the traffic multiplexer used on the wireline access of the FN-RG 315 may correspond to a VLAN. The FN-RG 315 transmits 4030 a wireline data session request on the mapped traffic multiplexer used on its wireline access W-AGF.

The wireless subscription received from the FN-RG 315 may trigger the request to establish a protocol data unit (PDU) session. The W-AGF 320 maps 4035 the traffic multiplexer used on the wireline access of the FN-RG 315 to a wireless data session selector based on the first information. The data session selector may refer to a Data Network Name. Alternatively or in addition, the data session selector may refer to slice identifier. The W-AGF 320 transmits 4040 the request for the wireless data session with the selector to the core network.

In some embodiments, the ACS 340 may transmit other provisioning information (referred to as "third information" hereinafter) to the 5G-RG 310. The third information may be used for mapping from the wireless quality of service (QoS) to the wireline QoS. In some embodiments, the 3GPP driver in the 5G-RG 310 may map the uplink traffic to 3GPP QoS flows based on NAS SM signalling received from 5GC. The 3GPP QoS flows then need to be mapped to BBF QoS. Thus, the provisioning information sent by the ACS 340 to the 5G-RG 310. may be extended to provide a mapping from 3GPP 5QI (main parameter defining 3GPP QoS) to wireline Qos parameters (e.g. IEEE 802.1p priority or DSCP Diffsery Code Point as defined in IETF specifications).

Figure 5:
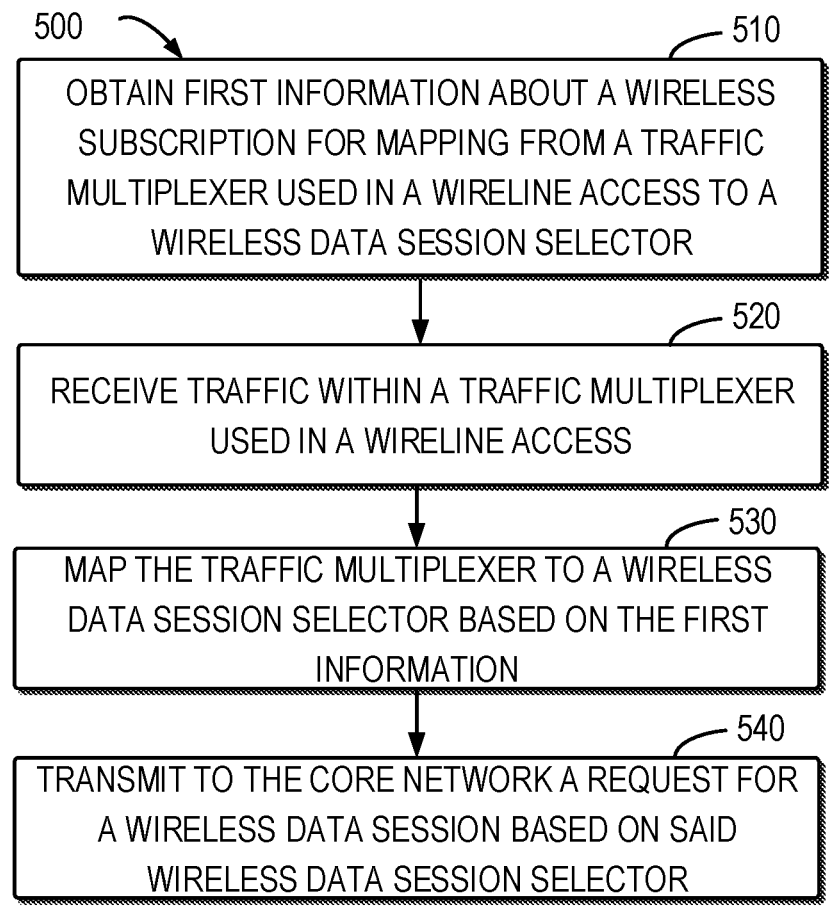
FIG. 5 illustrates a flow chart of a method implemented at a communication device according to embodiments of the present disclosure.

FIG. 5 illustrates a flow chart of a method 500 in accordance with embodiments of the present disclosure. The method 500 may be implemented at any suitable devices. Only for the purpose of illustrations, the method 500 is described to be implemented at the W-AGF 320.

At block 510, the W-AGF 320 obtains the first information from the PCF 330. The first information is about the wireless subscription for mapping from a traffic multiplexer used in the wireline access to a wireless data session selector. The wireless subscription is associated with the wireline access.

In some embodiments, the first information may be transmitted in the URSP policy and the W-AGF 320 may extract the first information from the URSP policy. If the first information is transmitted in the URSP policy, it may reuse traffic filter information in URSP with the remark that URSP referring to Ethernet Headers have to be sent for a FN-RG 315 even though the USRP relates to a PDU Session of the IP type.

At block 520, the W-AGF 320 receives traffic within a traffic multiplexer used in the wireline access from the FN-RG 315. The application traffic has been mapped to the traffic multiplexer (for example, VLAN) used in the wireline access by the FN-RG 315 based on the second information. The second information may be used for mapping the application to the traffic multiplexer.

At block 530, the W-AGF 320 maps the traffic multiplexer used in the wireline access to a wireless data session selector based on the first information. The data session selector may refer to a Data Network Name. Alternatively or in addition, the data session selector may refer to slice identifier.

At block 540, the W-AGF 320 transmits a request for a wireless data session based on said wireless data session selector to the core network. The traffic received from the FN-RG 315 may trigger the request to establish a protocol data unit (PDU) session.

Figure 6:
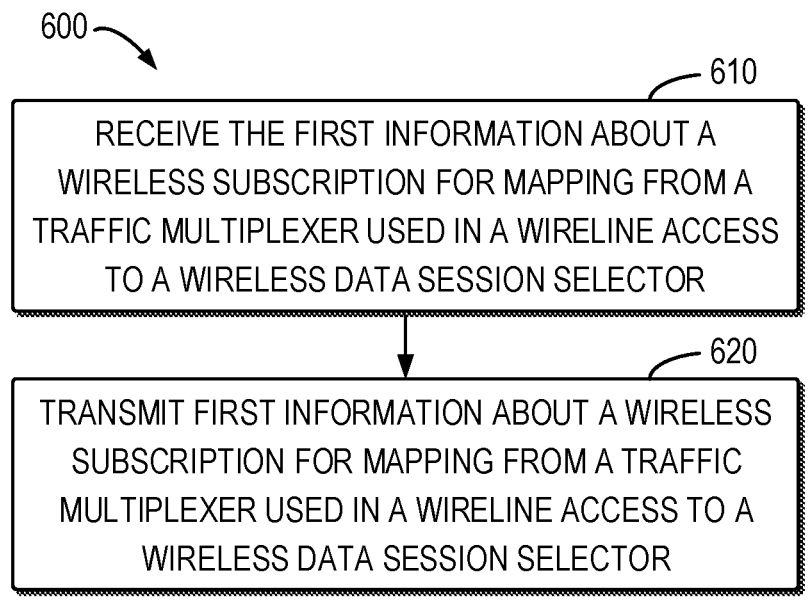
FIG. 6 illustrates a flow chart of a method implemented at a communication device according to embodiments of the present disclosure.

FIG. 6 illustrates a flow chart of a method 600 in accordance with embodiments of the present disclosure. The method 600 may be implemented at any suitable devices. Only for the purpose of illustrations, the method 600 is described to be implemented at the PCF 330.

At block 610, the PCF 330 obtains the first information from the ACS 340. The first information is about a wireless subscription for mapping from a traffic multiplexer used in the wireline access to a wireless data session selector. Alternatively the first information may be about a wireless subscription for mapping from a traffic multiplexer used in the wireline access to a prioritized list of wireless data session selectors.

In some embodiments, the first information may not be directly transmitted from the ACS 340 to the PCF 330. In some embodiments, the ACS 340 or the operation system OSS may transmit the first information to the UDM 375 via the NEF 390. The UDM 375 may store the first information in the UDR 370. The PCF 330 may be notified by the UDR that policy data about a wireless subscription that it serves has changed and access to the UDR 370 to obtain the first information. In this way, the indirection interactions between the ACS 340 and the PCF 330 have been accomplished. In this way, a new application program interface (API) among the UDM 375, UDR 370, the NEF 390 and the ACS 340 is defined as part of mapping from wireless subscription to data sessions.

For example, in some embodiments, an operation support system (OSS) may ensure proper configuration of the wireless subscription with the list of subscribed PDU sessions of the corresponding user. For each subscribed PDU sessions, the service multiplexer (e.g. VLAN) used on the wireline access is also configured. In some embodiments, the OSS (or the ACS 340) may issue a request to ensure such configuration of the corresponding wireless subscription via the NEF 390. The NEF 390 may check the right to issue such request. The NEF 390 may forward the request to the UDM (375). The UDM 375 may update the SM subscription data in the UDR 370 of the corresponding user with the list of subscribed PDU sessions (DNN, S-NSSAI). If the PCF 330 is aware that the terminal is reachable, the PCF 330 may check whether the URSP configuration on the UE is aligned.

At block 620, the PCF 330 transmits the first information to W-AGF 320. The first information is about the wireless subscription for mapping from a traffic multiplexer used in the wireline access to the wireless data session selector. The wireless subscription is associated with the wireline access.

In some embodiments, the first information may be transmitted in the URSP policy. If the first information is transmitted in the URSP policy, it may reuse traffic filter information in URSP with the remark that URSP referring to Ethernet Headers have to be sent for a FN-RG 315 even though the USRP relates to a PDU Session of the IP type.

Figure 7:
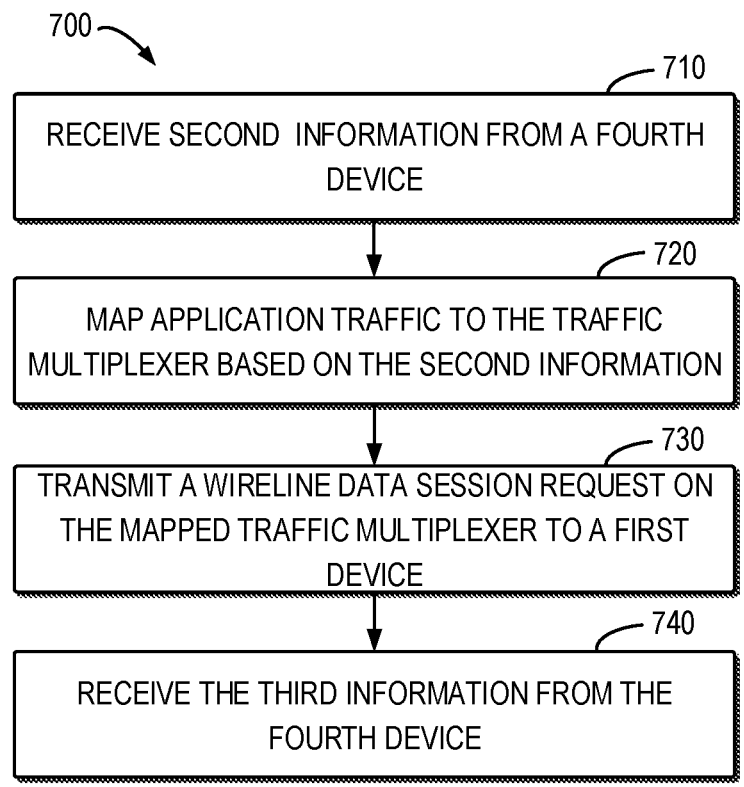
FIG. 7 illustrates a flow chart of a method implemented at a communication device according to embodiments of the present disclosure.

FIG. 7 illustrates a flow chart of a method 700 in accordance with embodiments of the present disclosure. The method 700 may be implemented at any suitable devices. Only for the purpose of illustrations, the method 700 is described to be implemented at the FN-RG 310.

At block 710, the FN-RG 315 receives the second information from the ACS 340. The second information may be used for mapping the wireless subscription to a traffic multiplexer.

At block 720, if the FN-RG 315 detects the application traffic, the FN-RG 315 maps the application traffic to the traffic multiplexer based on the second information. The application may comprise one or more of: IP Multimedia Subsystem (IMS) voice, Internet Protocol Television (IPTV), Internet. In some embodiments, the traffic multiplexer may correspond to the VLAN.

At block 730, the FN-RG 315 transmits 4030 the wireline data session request on the mapped traffic multiplexer to the W-AGF 320. At block 740, the 5G-RG 310 receives third information from the ACS 340. The other information may be used for mapping from the wireless quality of service (QoS) to the wireline QoS. In some embodiments, the 3GPP driver in the 5G-RG 310 may map the uplink traffic to 3GPP QoS flows based on NAS SM signalling received from 5GC. The 3GPP QoS flows then need to be mapped to BBF QoS. Thus, the rules may be extended to provide a mapping from 3GPP 5QI (main parameter defining 3GPP QoS) to wireline Qos parameters (e.g. IEEE 802.1p priority).

Figure 8:
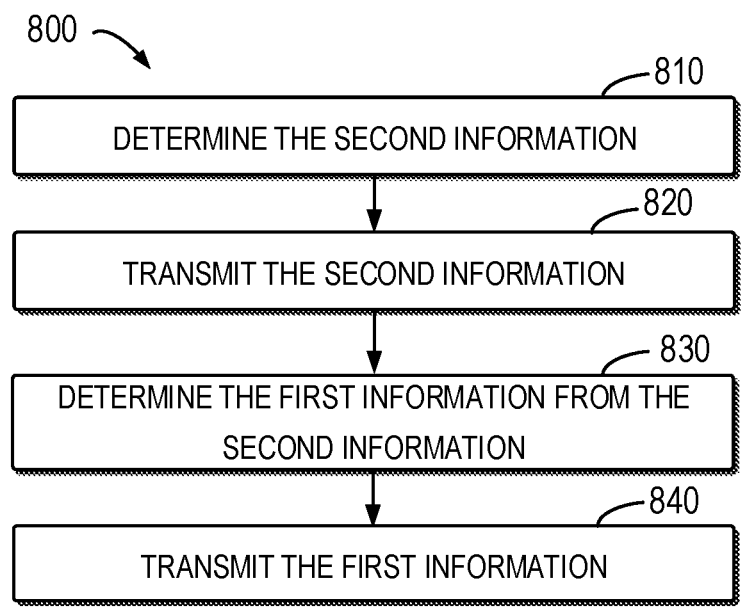
FIG. 8 illustrates a flow chart of a method implemented at a communication device according to embodiments of the present disclosure.

FIG. 8 illustrates a flow chart of a method 800 in accordance with embodiments of the present disclosure. The method 800 may be implemented at any suitable devices. Only for the purpose of illustrations, the method 800 is described to be implemented at the ACS 340.

At block 810, the ACS 340 determines the second information. The second information may be used for mapping the wireless subscription to a traffic multiplexer. At block 820, the ACS 340 transmits the second information to the FN-RG 315.

At block 830, the ACS 340 determines the first information based on the second information. The first information is about a wireless subscription for mapping from a traffic multiplexer used in the wireline access to a wireless data session selector.

At block 840, the ACS 340 transmits the first information to the PCF 330. In some embodiments, the first information may not be directly transmitted from the ACS 340 to the PCF 330. In some embodiments, the ACS 340 may communicate with the PCF 330 through existing APIs on the ACS 340 going to the OSS system. The OSS system should make sure the coordination is done and could communicate with the 3GPP UDR. The wireless subscription is associated with the wireline access.

In some embodiments, the ACS 340 may transmit the first information to the UDM. The UDM may store the first information in the UDR 370. The PCF 330 may have subscribed to the UDR 370 about changes of the first information and get it via a notification of change of such information. In this way, the indirection interactions between the ACS 340 and the PCF 330 have been accomplished. In this way, a new application program interface (API) among the UDM, the NEF 390 and the ACS 340 is defined as part of mapping from wireline and wireless subscription.

In some embodiments, the ACS 340 may transmit the third information to the 5G-RG 310. The third information may be used for mapping from the wireless quality of service (QoS) to the wireline QoS. In some embodiments, the 3GPP driver in the 5G-RG 310 may map the uplink traffic to 3GPP QoS flows based on NAS SM signalling received from 5GC. The 3GPP QoS flows then need to be mapped to BBF QoS. Thus, the rules may be extended to provide a mapping from 3GPP 5QI (main parameter defining 3GPP QoS) to wireline QoS parameters (e.g. IEEE 802.1p priority).

In some embodiments, an apparatus for performing the method 500 (for example, the W-AGF 320) may comprise respective means for performing the corresponding steps in the method 500. These means may be implemented in any suitable manners. For example, it can be implemented by circuitry or software modules.

In some embodiments, the apparatus comprises means for obtaining, at the first device and from a second device in a core network, first information about a wireless subscription for mapping from a traffic multiplexer used in a wireline access to a wireless data session selector; means for receiving from a third device, traffic within a traffic multiplexer used in a wireline access, the traffic multiplexer being mapped in the third device from an application based on second information; means for mapping the traffic multiplexer used in the wireline access to a wireless data session selector based on the first information; and means for, to the core network, a request for a wireless data session based on the wireless data session selector.

In some embodiments, the wireless subscription is associated with the wireline access.

In some embodiments, the wireless data session selector is at least one of Data Network Name and a slice identifier.

In some embodiments, the traffic multiplexer corresponds to a Virtual Local Area Network, VLAN.

In some embodiments, the means for obtaining the first information comprises: means for receiving user equipment route selection policy, URSP, from the second device; and means for extracting the first information from the URSP.

In some embodiments, the means for transmitting the request comprises means for transmitting the request for the wireless data session with the wireless data session selector which is derived from the first information.

In some embodiments, wherein the first device is an access gateway function device, the second device is a policy control function, PCF, device, the third device is a residential gateway device.

In some embodiments, an apparatus for performing the method 600 (for example, the PCF 330) may comprise respective means for performing the corresponding steps in the method 600. These means may be implemented in any suitable manners. For example, it can be implemented by circuitry or software modules.

In some embodiments, the apparatus comprises means for receiving, from a fourth device, first information about a wireless subscription for mapping from a traffic multiplexer used in a wireline access to a wireless data session selector; and means for transmitting the first information to a first device.

In some embodiments, wherein the wireless subscription is associated with the wireline access.

In some embodiments, the wireless data session selector is at least one of Data Network Name and a slice identifier.

In some embodiments, wherein the traffic multiplexer corresponds to a Virtual Local Area Network, VLAN.

In some embodiments, the means for wherein transmitting the first information comprises: means for transmitting, to the first device, user equipment route selection policy (URSP) comprising the first information.

In some embodiments, the apparatus further comprises means for obtaining the first information from the fourth device via a data repository storing user related subscriptions.

In some embodiments, the first device is an access gateway function device, the second device is a policy control function device, and the fourth device is a wireline service controller.

In some embodiments, an apparatus for performing the method 700 (for example, the FN-RG 315) may comprise respective means for performing the corresponding steps in the method 700. These means may be implemented in any suitable manners. For example, it can be implemented by circuitry or software modules.

In some embodiments, the apparatus comprises means for receiving second information from a fourth device, the second information being for mapping an application to a traffic multiplexer used in a wireline access; means for in response to detecting application traffic, mapping the application traffic a traffic multiplexer used in a wireline access based on the second information; means for transmitting, based on the second information, a wireline data session request on the mapped traffic multiplexer used in a wireline access; and means for receiving further information from the fourth device, the further information being for mapping a wireless quality of service to a wireline quality of service.

In some embodiments, the wireless quality of service corresponds to a 5G QoS indicator.

In some embodiments, the third device is a residential gateway device, and the fourth device is a wireline service controller.

In some embodiments, an apparatus for performing the method 800 (for example, the ACS 340) may comprise respective means for performing the corresponding steps in the method 800. These means may be implemented in any suitable manners. For example, it can be implemented by circuitry or software modules.

In some embodiments, the apparatus comprises means for determining second information for mapping an application to a traffic multiplexer used in a wireline access; means for transmitting the second information to a third device; means for determining, based on the second information, first information about a wireless subscription for mapping from a traffic multiplexer used in a wireline access to a wireless data session selector, to ensure mapping between the first information and the second information; and means for transmitting the first information to a second device.

In some embodiments, the apparatus comprises means for transmitting the first information to the second device via a data repository storing user related subscriptions.

In some embodiments, the second device is a policy control function, PCF, device, the third device is a residential gateway device, and the fourth device is a wireline service controller.

Figure 9:
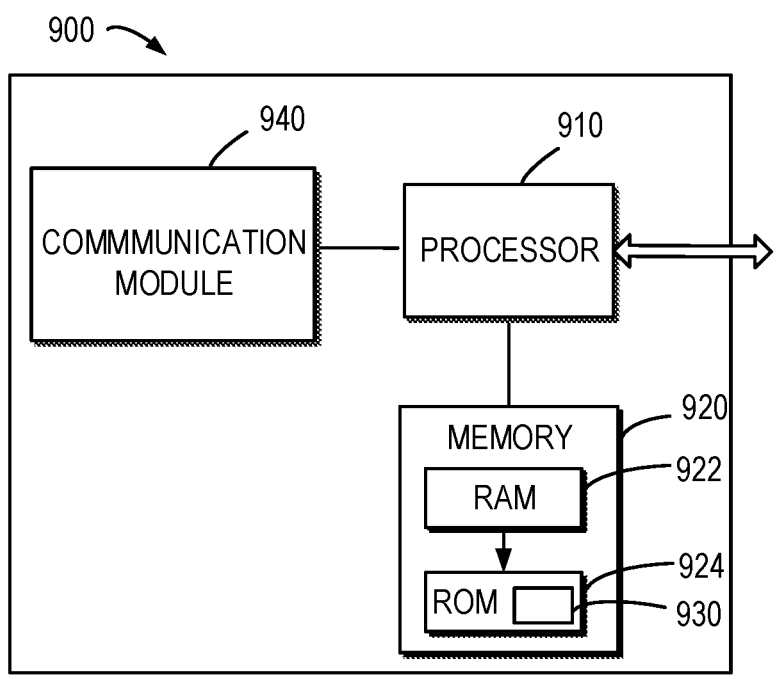
FIG. 9 illustrates a schematic diagram of a device according to embodiments of the present disclosure.

FIG. 9 is a simplified block diagram of a device 900 that is suitable for implementing embodiments of the present disclosure. The device 900 may be provided to implement the communication devices as shown in FIG. 1. As shown, the device 900 includes one or more processors 910, one or more memories 920 coupled to the processor 910, and one or more communication modules 940 coupled to the processor 910.

The communication module 940 is for bidirectional communications. The communication module 940 has at least one antenna to facilitate communication. The communication interface may represent any interface that is necessary for communication with other network elements.

The processor 910 may be of any type suitable to the local technical network and may include one or more of the following: general purpose computers, special purpose computers, microprocessors, digital signal processors (DSPs) and processors based on multicore processor architecture, as non-limiting examples. The device 900 may have multiple processors, such as an application specific integrated circuit chip that is slaved in time to a clock which synchronizes the main processor.

The memory 920 may include one or more non-volatile memories and one or more volatile memories. Examples of the non-volatile memories include, but are not limited to, a Read Only Memory (ROM) 924, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 922 and other volatile memories that will not last in the power-down duration.

A computer program 930 includes computer executable instructions that are executed by the associated processor 910. The program 930 may be stored in the ROM 924. The processor 910 may perform any suitable actions and processing by loading the program 930 into the RAM 922.

The embodiments of the present disclosure may be implemented by means of the program 930 so that the device 900 may perform any process of the disclosure as discussed with reference to FIGS. 4 and 8. The embodiments of the present disclosure may also be implemented by hardware or by a combination of software and hardware.

Figure 10:
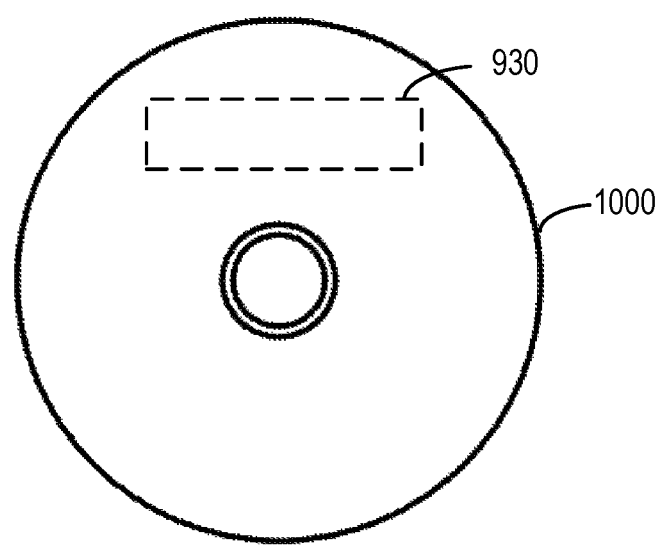
FIG. 10 shows a block diagram of an example computer readable medium in accordance with some embodiments of the present disclosure.

In some example embodiments, the program 930 may be tangibly contained in a computer readable medium which may be included in the device 900 (such as in the memory 920) or other storage devices that are accessible by the device 900. The device 900 may load the program 930 from the computer readable medium to the RAM 922 for execution. The computer readable medium may include any types of tangible non-volatile storage, such as ROM, EPROM, a flash memory, a hard disk, CD, DVD, and the like. FIG. 10 shows an example of the computer readable medium 1000 in form of CD or DVD. The computer readable medium has the program 930 stored thereon.

It should be appreciated that future networks may utilize network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications, this may mean node operations to be carried out, at least partly, in a central/centralized unit, CU, (e.g. server, host or node) operationally coupled to distributed unit, DU, (e.g. a radio head/node). It is also possible that node operations will be distributed among a plurality of servers, nodes or hosts. It should also be understood that the distribution of labour between core network operations and base station operations may vary depending on implementation.

In an embodiment, the server may generate a virtual network through which the server communicates with the distributed unit. In general, virtual networking may involve a process of combining hardware and software network resources and network functionality into a single, software-based administrative entity, a virtual network. Such virtual network may provide flexible distribution of operations between the server and the radio head/node. In practice, any digital signal processing task may be performed in either the CU or the DU and the boundary where the responsibility is shifted between the CU and the DU may be selected according to implementation.

Therefore, in an embodiment, a CU-DU architecture is implemented. In such case the apparatus 500 may be comprised in a central unit (e.g. a control unit, an edge cloud server, a server) operatively coupled (e.g. via a wireless or wired network) to a distributed unit (e.g. a remote radio head/node). That is, the central unit (e.g. an edge cloud server) and the distributed unit may be stand-alone apparatuses communicating with each other via a radio path or via a wired connection. Alternatively, they may be in a same entity communicating via a wired connection, etc. The edge cloud or edge cloud server may serve a plurality of distributed units or a radio access networks. In an embodiment, at least some of the described processes may be performed by the central unit. In another embodiment, the apparatus 500 may be instead comprised in the distributed unit, and at least some of the described processes may be performed by the distributed unit.

In an embodiment, the execution of at least some of the functionalities of the apparatus 500 may be shared between two physically separate devices (DU and CU) forming one operational entity. Therefore, the apparatus may be seen to depict the operational entity comprising one or more physically separate devices for executing at least some of the described processes. In an embodiment, such CU-DU architecture may provide flexible distribution of operations between the CU and the DU. In practice, any digital signal processing task may be performed in either the CU or the DU and the boundary where the responsibility is shifted between the CU and the DU may be selected according to implementation. In an embodiment, the apparatus 500 controls the execution of the processes, regardless of the location of the apparatus and regardless of where the processes/functions are carried out.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the methods 500, 600, 700 and 800 as described above with reference to FIGS. 5, 6, 7 and 8. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A wireless access gateway function (W-AGF) comprising:
   at least one processor; and a memory coupled to the at least one processor, the memory storing instructions therein, the instructions, when executed by the at least one processor, causing the W-AGF to perform operations, the operations comprising:
   obtaining from a policy control function (PCF) of a core network, first information comprising mapping of a traffic multiplexer used in connecting a fixed network-residential gateway (FN-RG) to a wireline access interface of the W-AGF to a list of wireless data session selectors;
   receiving traffic from the FN-RG via the traffic multiplexer and the wireline access interface of the W-AGF;
   mapping the traffic receive form the FN-RG via the traffic multiplexer and the wireline access interface to a wireless data session selector included in the list of wireless data session selectors based on the first information, wherein respective wireless data session selectors included in the list of wireless data session selectors comprise at least one of: Data Network Name (DNN) or a slice identifier of a network slice for a wireless data session;
   transmitting, to a core network, a request for the wireless data session based on the wireless data session selector; and
   transmitting the traffic via the wireless data session to the core network.

2. The W-AGF of claim 1, wherein the traffic multiplexer corresponds to a Virtual Local Area Network (VLAN).

3. The W-AGF of claim 1, wherein the obtaining the first information comprises:
   receiving user equipment route selection policy (URSP) from the PCF; and
   extracting the first information from the URSP.

4. The W-AGF of claim 1, wherein the transmitting the wireless data session request comprises transmitting non-access stratum signaling comprising a request to register to and establish the wireless data connection with the core network.

5. A policy control function (PCF), comprising:
   at least one processor; and
   a memory coupled to the at least one processor, the memory storing instructions therein, the instructions, when executed by the at least one processor, causing the PCF to perform operations, the operations comprising:
   receiving, from an auto-configuration server (ACS), first information comprising mapping from a traffic multiplexer used in a wireline access to a list of wireless data session selectors, wherein respective wireless data selectors included in the list of wireless data session selectors comprise—at least one of a Data Network name or a slice identifier for a wireless data session;
   determining whether the W-AGF is reachable;
   determining, based on determining that the W-AGF is reachable, whether policy information between the W-AGF and a fixed network -residential gateway (FN-RG) is aligned; and
   transmitting a user equipment (UE) route selection policy (URSP) including the first information to a wireless access gateway function (W-AGF) based on determining that the policy information between the W-AGF and the FN-RG is aligned.

6. The PCF of claim 5, wherein the traffic multiplexer corresponds to a Virtual Local Area Network (VLAN).

7. The PCF of claim 5, wherein the receiving the first information comprises receiving the first information from the ACS via a data repository storing a user related subscription comprising the first information.

8. A fixed network-residential gateway (FN-RG), comprising:
at least one processor; and
a memory coupled to the at least one processor, the memory storing instructions therein, the instructions, when executed by the at least one processor, causing the FN-RG to perform operations, the operations comprising:
receiving, second information from an auto-configuration (ACS), the second information comprising a mapping of an application comprising at least one of internet, internet protocol (IP) multimedia subsystem (IMS) voice or IP television (IPTV) to a traffic multiplexer corresponding to a virtual local area network (VLAN) used in connecting the FN-RG to a wireline access interface of a wireless access gateway function (W-AGF);
in response to detecting application traffic for the application comprising at least one of the internet, IMS voice or IPTV, mapping the application traffic to the traffic multiplexer corresponding to the VLAN based on the second information;
transmitting, based on the second information, a wireline data session request to W-AGF via the traffic multiplexer used in connecting the FN-RG to a wireline access interface of the W-AGF, the wireline data session for establishing a wireline data session between the FN-RG and the W-AGF; and
receiving third information from the ACS, the third information comprising a mapping of wireless quality of service (QoS) parameters for a wireless data session between the W-AGF and a core network of a communication network to wireline QoS parameters of the wireless data session.

9. The FN-RG of claim 8, wherein the wireless quality of service parameters corresponds to a 5G QoS indicator.

10. An auto-configuration server (ACS), comprising:
at least one processor; and
a memory coupled to the at least one processor, the memory storing instructions therein, the instructions, when executed by the at least one processor, causing the ACS to perform operations, the operations comprising:
determine second information comprising a mapping of an application comprising at least one of internet, internet protocol (IP) multimedia subsystem (IMS) voice or IP television (IPTV) to a traffic multiplexer corresponding to a virtual local area network (VLAN) used in connecting a network-residential gateway (FN-RG) to a wireline access interface of a wireless access gateway function (W-AGF);
transmitting the second information to a FN-RG;
determining, based on the second information, first information comprising a mapping from the traffic multiplexer corresponding to the VLAN used in connecting a wireline access interface of the W-AGF to a wireless data session selector, to ensure mapping between the first information and the second information, wherein the first information comprises reused traffic filter information from a user equipment route selection policy (URSP); and
transmitting the first information to a policy control function (PCF).

11. The fourth ACS of claim 10, wherein the ACS is further caused to: transmit the first information to the PCF via a data repository storing user related subscriptions.

12. The ACS of claim 10, wherein the operations further comprise mapping the traffic multiplexor used in connecting the FN-RG to the wireline access interface of the W-AGF to one or more protocol data unit (PDU) session subscription parameters, using the first information and an application programming interface (API) supported by a core network.

* * * * *